Inventors
Alfred B. Jepson
James B. Cooper
By Reynolds & Beach
Attorneys

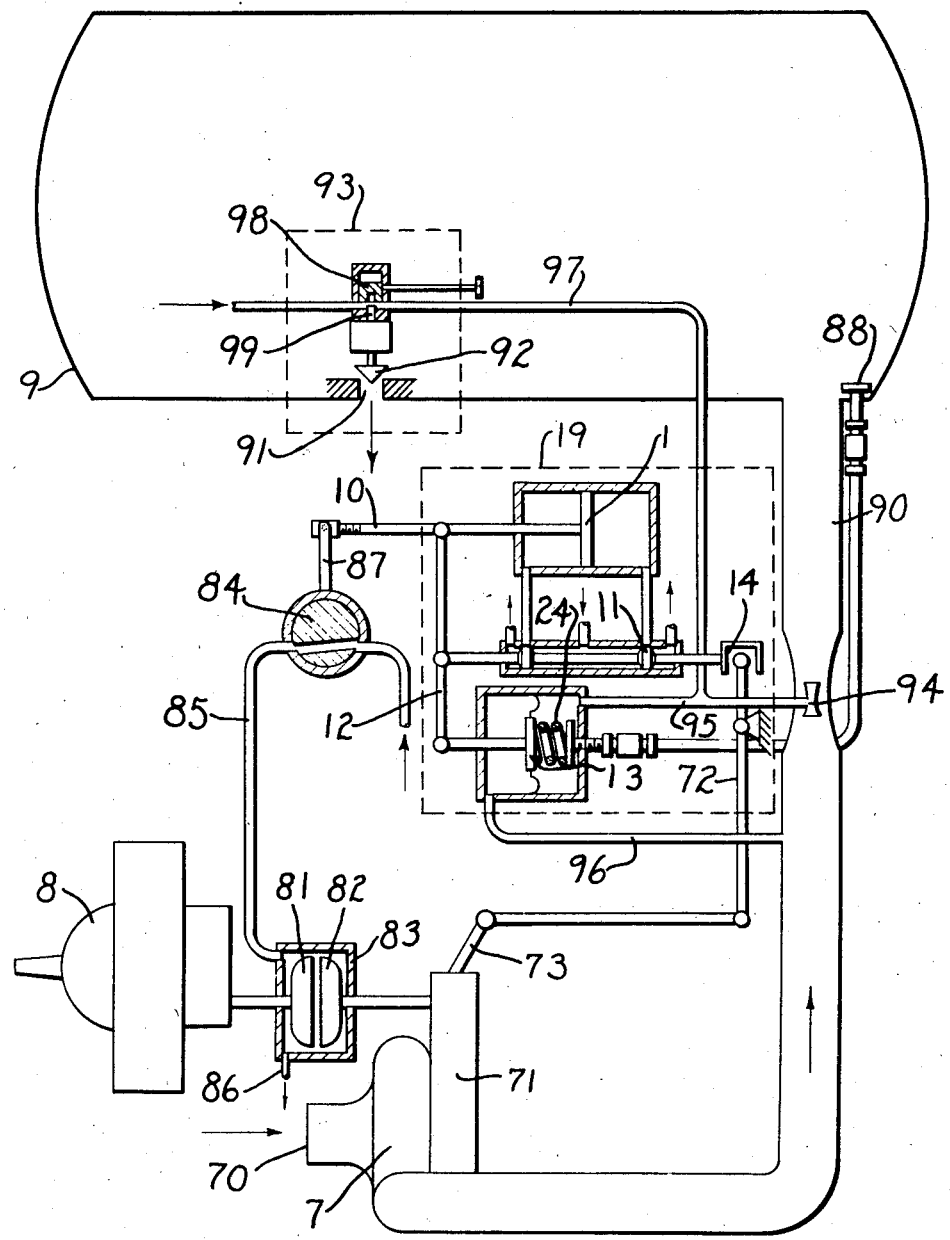

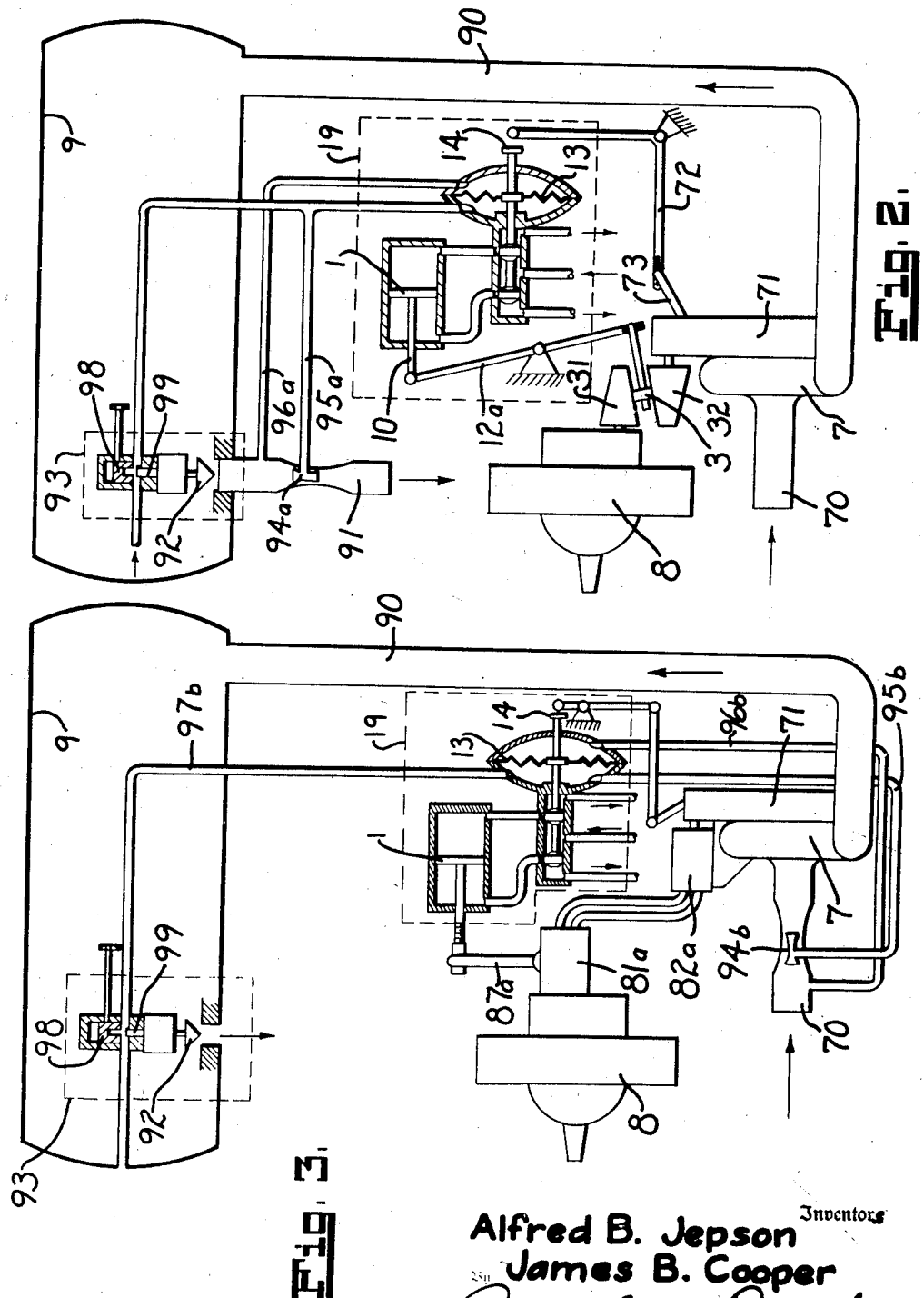

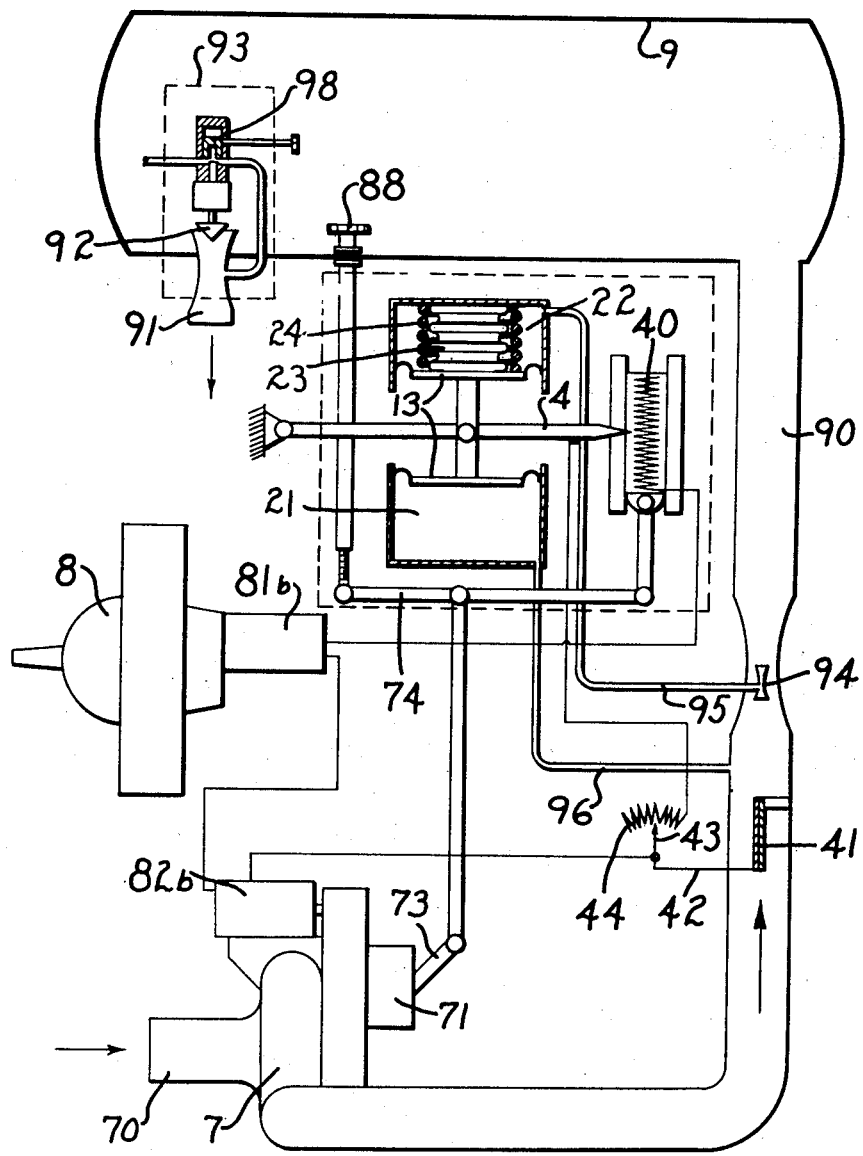

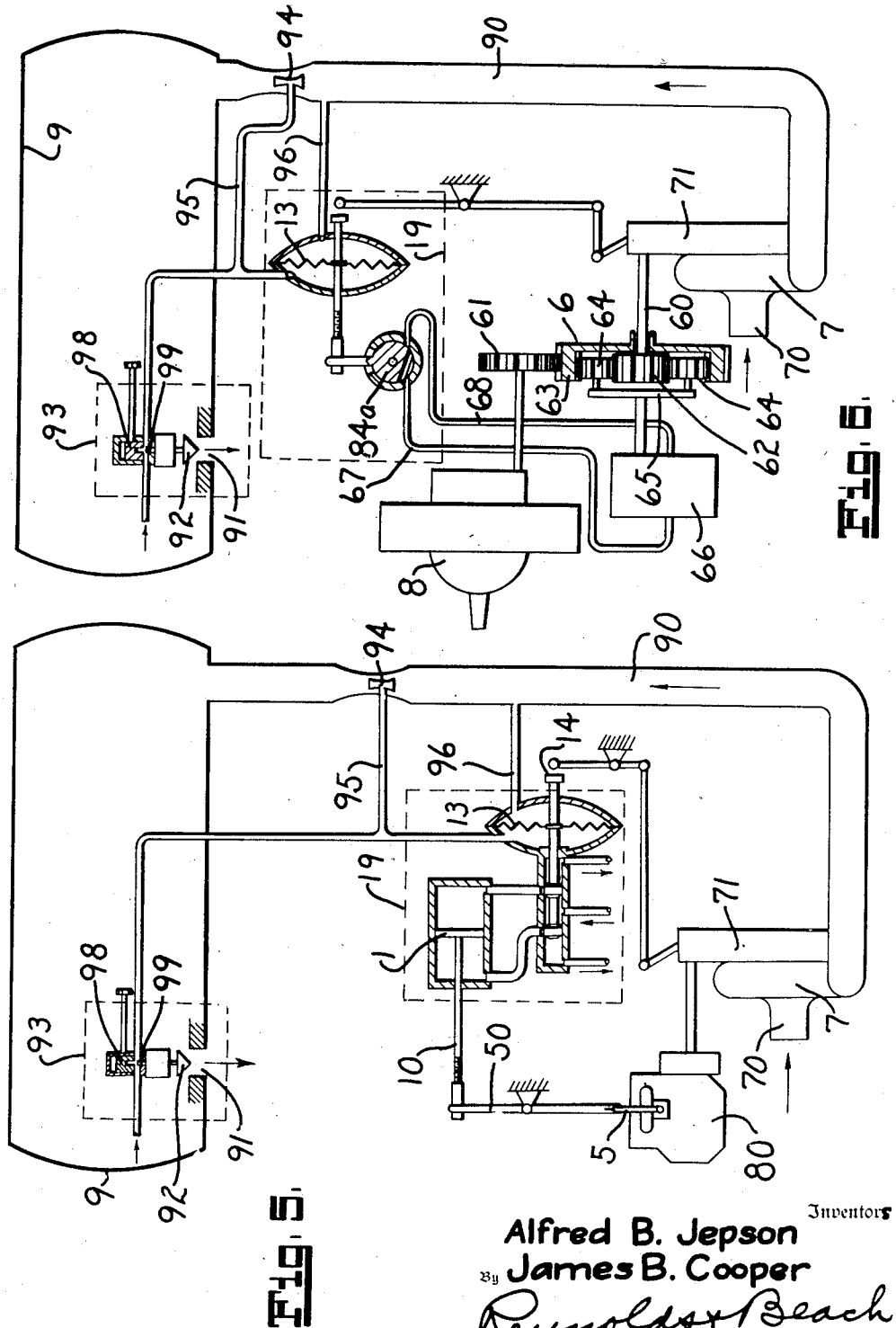

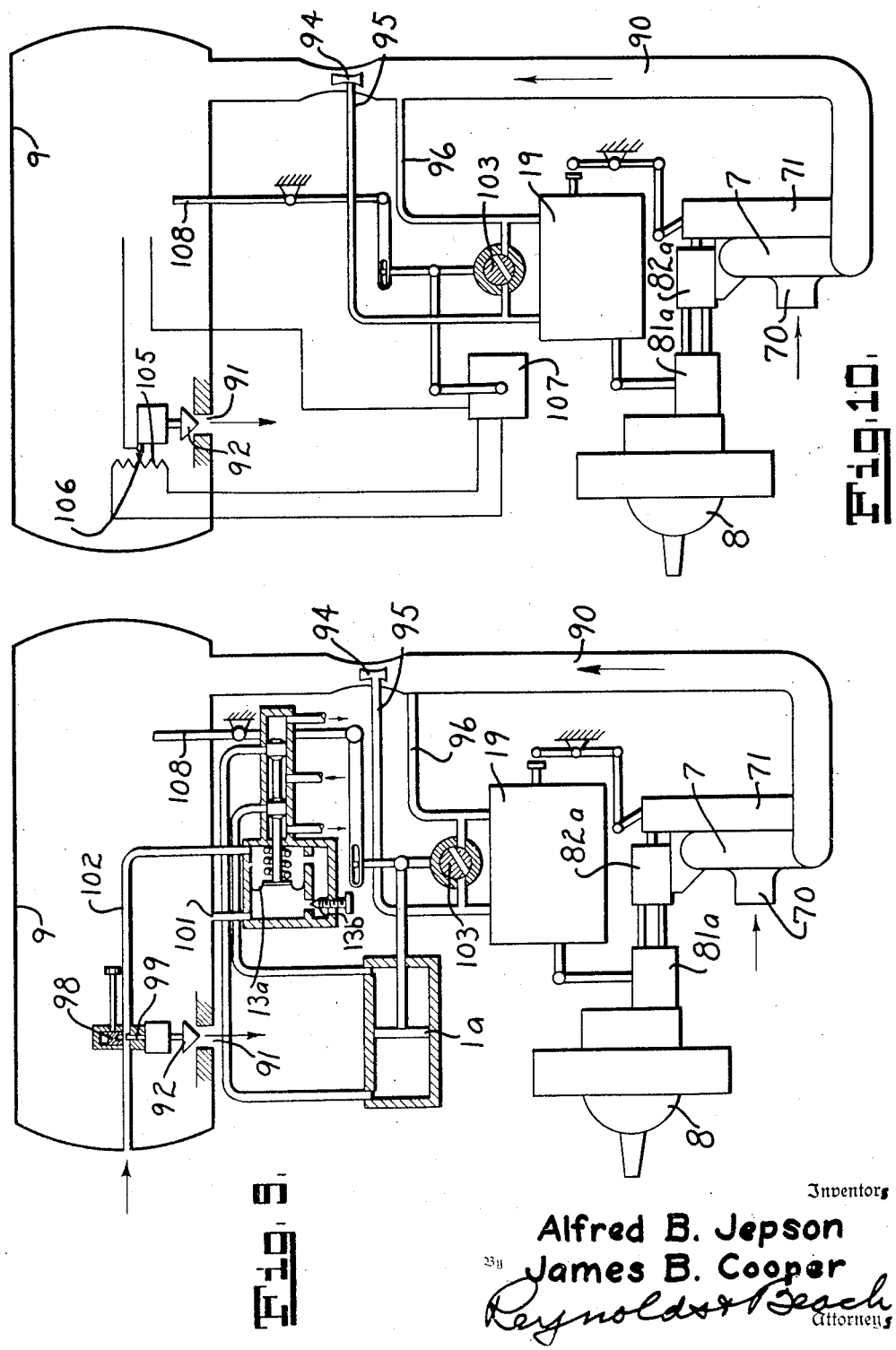

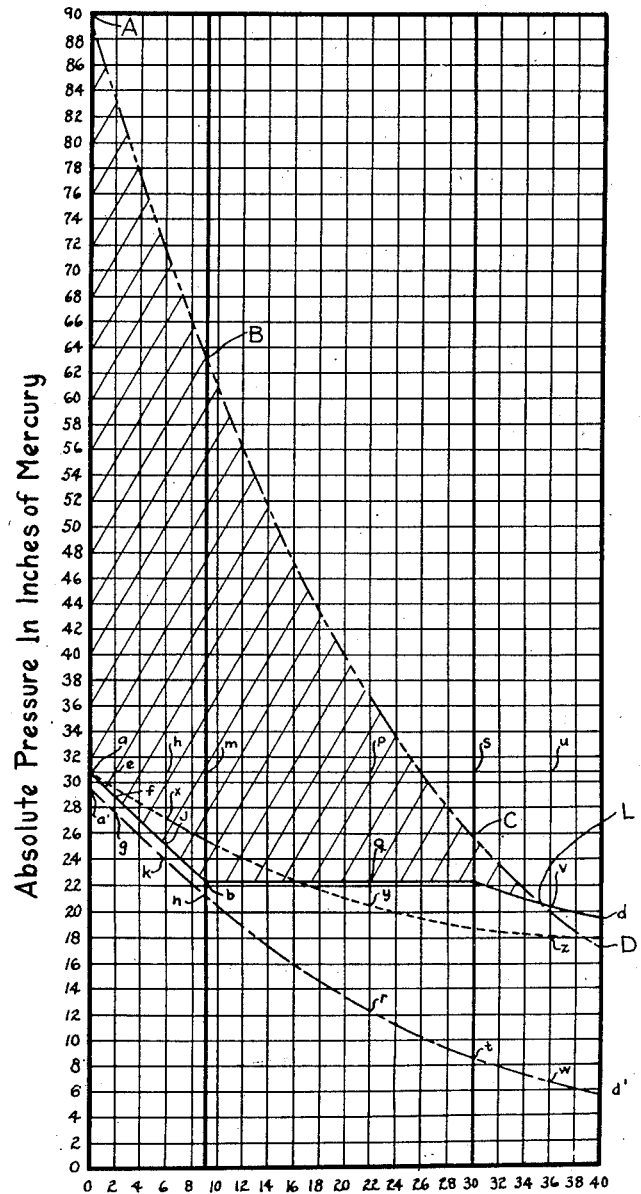

Patented Jan. 30, 1951

2,539,430

UNITED STATES PATENT OFFICE 2,539,430

PRESSURE CABIN SYSTEM

Alfred B. Jepson and James B. Cooper, Seattle, Wash., assignors to Boeing Airplane Company, a corporation of Delaware Application October 18, 1941, Serial No. 415,603

13 Claims. (Cl. 98—1.5)

The present invention deals with the control of pressure within an aircraft cabin, and in particular concerns the pressure creating and pressure controlling system as a whole, and the relationship of the several parts to one another. It relates to the regulation of the pressure supply or inflow in such manner that this inflow is conformable in pressure to the pressure conditions which it is desired to maintain within the cabin, and is conformable in rate to the rate of outflow from the cabin which is necessary to maintain the desired cabin pressure and to achieve the necessary ventilation. Withal, such regulation is accomplished in such manner as to achieve this balance without necessitating an excessive rate of flow through the cabin at any time, nor the use of more power for compressor operation than is needed to achieve the required cabin pressure conditions.

Excessive compression not only wastes energy but produces much heat; the temperatures thereby induced are not only uncomfortable but may actually be unbearable. Such temperatures would be most greatly excessive at low altitudes where the natural temperatures are relatively high, but at higher altitudes, where compression-induced temperatures might compensate for lower natural temperatures, the compression-induced temperatures would be lower. The control of such temperatures, over such a range of flow, pressure, and temperature conditions, would be a major problem. By eliminating variation of flow rate as a factor in temperature control, and by avoiding compression in excess of that required in the cabin, and corresponding excessive temperatures, the problem of temperature control is greatly simplified.

Early attempts to supercharge aircraft cabins assumed that pressure maintenance alone was adequate, and gave no thought to the necessity of ventilation. Ventilation is absolutely essential, not only because air becomes vitiated if the oxygen consumed is not replaced, and the carbon dioxide is not removed, but experience has shown that body odors, in a tightly closed, though supercharged, aircraft cabin quickly become objectionable. Removal of moisture produced by breathing is likewise very desirable.

In attempting to obtain ventilation in early pressurized aircraft cabins, once the necessity therefor had been realized, it was only natural, where a relief valve set to maintain a desired cabin pressure (absolute or differential) was employed to supply air under a pressure higher than the desired cabin pressure in excess of that required to maintain such cabin pressure, so that the excess might escape past the relief valve. It was discovered, however, that the rapidly and widely varying external pressures created problems arising from the large and changing pressure differences between the interior and the exterior; that rate of flow had to be maintained below some low maximum; and that, with the blowers or compressors most suited to or available for such use, their delivery rate at low altitudes was far in excess of the rate suited to the comfort, or even the well-being, of the cabin occupants.

To explain in somewhat greater detail, the direct-driven centrifugal superchargers employed had to be designed to deliver sufficient air to compensate at least for cabin leakage so as to maintain a desired cabin absolute pressure at some selected altitude. If we refer to Figure 11, which is a chart of certain pressure-altitude relations, that selected altitude might be 35,000 feet, and the desired cabin absolute pressure to be maintained at that altitude, according to Figure 11, is nearly 21 inches of mercury. Actual atmospheric pressure at that altitude is nearly 7 inches of mercury, so the supercharger compression ratio is 3 to 1. It is inherent in such superchargers that, at any given speed of rotation, the compression ratio remains the same at all intake pressures, or altitudes, hence at sea level the delivered pressure would be in the vicinity of 90 inches of mercury—obviously far more than is required. All compression in excess of actual requirements represents wasted energy, of course.

Since it was obviously impractical to admit such great excesses of pressure to the cabin, provision was made for control of the pressure admitted to the cabin, to keep it reasonably close to the cabin pressure requirements, and for control of the rate of inflow, as in the patent to N. C. Price, No. 2,208,554. An inlet valve held back the excess of pressure from the supercharger, admitting to the cabin only a sufficient excess over cabin pressure requirements as would compensate for leakage, and provide for continuous outflow past an outlet valve at a bearable ventilating rate. The outlet valve, in turn, conserved the cabin pressure and maintained it at a desired value, continually relieving the excess for ventilation. This system has operated successfully, but nevertheless it is wasteful. The excess pressure developed by the supercharger, especially at lower altitude ranges, represents a waste of energy, and reduces the energy available for other purposes. The high temperatures accompanying high compression had still to be dealt with. It can be demonstrated that such waste energy usefully applied, would increase the speed of a commercial airliner by several miles an hour.

It is the aim of this invention to avoid such waste, and its consequences, and to provide a control system for an aircraft cabin for high altitude flight which will, at every altitude, deliver air within the cabin at a desired low rate of flow, and maintain a desired cabin pressure. The result is to: (a) provide flow through at a proper yet easily bearable rate, for ventilation; (b) compensate for leakage; and (c) maintain cabin pressure at a desired value, by means of an outlet valve, of reasonable size and weight.

In a few words, according to the present invention, flow, and flow alone, is regulated by governing the effective output of a compressor to the cabin, as by altering the compressor's speed; and pressure is regulated by a simple outflow valve. The inflow to the cabin from the compressor is maintained at the desired rate (just sufficient to compensate for leakage, whether unintentional at the seams, etc., or intentional past the outflow valve) by regulation of the compressor's speed by an automatic control device which is directly governed by a flow-sensitive device. The value of the pressures at the compressor intake and discharge is immaterial so far as the action of the automatic control device is concerned in the maintenance of a constant rate of inflow to the cabin.

The values of the flow past the flow-sensitive device, and thus the output of the compressor, are chosen so as to provide an adequate ventilation through the cabin, keeping in mind that such flow, at all times, and regardless of the altitude of the airplane or the pressure within the cabin, must be equal to the leakage which results from all causes, intentionally and unintentionally. A pressure-sensitive device, without any relation to the pressure-producing source, the compressor, then acts to control the cabin pressure by regulation of the excess of flow which has not been released from the cabin by unintentional leakage. In the final analysis, then, the compressor, by regulation of its speed or its effective delivery rate in accordance with cabin pressure requirements and with external atmospheric pressures, as interpreted for control by a flow-sensitive device, supplies the proper value of pressure at the proper flow rate, and effects supply at a flow rate in excess of normal unintentional leakage, which excess is relieved past the regulating outflow valve, thereby to govern the cabin pressure, and to maintain the latter automatically at the desired value.

The present invention may be likened to the maintenance of water at a given level in an open but slightly leaky tank, from the bottom of which water is continuously drained past an outflow valve. If a pump (analogous to the compressor) supplies water to the tank (analogous to the airplane cabin) at a rate which corresponds to the rate at which it drains off by leakage and past the outflow valve, the water level or the static pressure in the tank remains unchanged, and the flow rate is that which corresponds to the pump's delivery rate. If the pump's delivery rate falls off, the water level and the static head drop, and if continued long enough the tank's water level is zero, though the inflow rate may continue to be just below the outflow rate. If the unintentional leakage rate plus the outflow past the valve (which can be compensatingly closed down as leakage increases) exceeds the rate of inflow, the tank's water level drops. If the pump's delivery rate increases, the water level in the tank can only be prevented from rising by further opening the outflow valve, but the increased delivery rate has increased the flow rate.

Only by balancing the inflow rate and the outflow rate can the water level be kept constant. The pump controls the flow rate, but not the actual water level; the outflow valve controls the water level flow rate through it to maintain the desired rate. It is possible to balance the inflow and outflow and maintain the desired water level by causing a float within the tank, by its rise or fall as the water level rises or falls, to open or to close down the outflow valve, and by providing a flow meter in the supply pipe, controlling the pump, to compensatingly cut down or increase the rate of flow of inflowing water as the actual rate of flow tends to increase or decrease, respectively. The analogy is not precise, but the above serves to illustrate the principle of this invention.

The present system, in its superficial aspects, differs most noticeably from the constant speed blower system of the Price patent in that no inflow valve is required, though one might be employed, if desired. There is no pneumatic "head," or excess of pressure, which requires to be held back. In principle the difference between the two systems goes somewhat deeper, as the above example shows.

To explain in somewhat greater detail, the Price patent mentioned disclosed an inflow valve which was influenced by flow conditions (at one time inflow, and at another time outflow) to deliver, from the large excess at most altitudes, air under pressure at a rate which conformed to the demands for pressure within the cabin; and this cabin pressure was primarily determined by an outflow valve subject to automatic pressure-sensitive controls, interconnected with the inflow valve. In the present invention an inflow valve is not required, and rate of inflow, and hence rate of outflow, is controlled by regulation of the speed or effective delivery of the compressor—using the term "compressor" generically to include a rotary or a Roots blower, a supercharger, a fan, any compressor, an air pump, or the like.

There have been inflow controls proposed heretofore which were intended to operate in accordance with pressure conditions (cabin absolute, external atmospheric, or differential), but not in conjunction with a related control active in itself to regulate outflow, and to provide a continually open outflow port, for ventilation at all times, under all pressure conditions, and at all altitudes, as the present system provides.

Briefly stated, we provide here a coordinated system, acting through control of compressor output (speed or effective delivery), to automatically balance inflow with separately controlled but continual outflow, to the end that such pressure conditions as are desired within the cabin, which may be any pressure between the ambient external atmospheric pressure at the altitude of the pressure cabin and substantially sea level atmospheric pressure, may be maintained within the cabin, yet at all times to maintain the rate of flow between predetermined maximum and minimum (more than zero) rates, and at all times to employ only so much power to drive the compressor as is necessary to maintain the required cabin pressure, at the selected rate of flow.

There is illustrated herein in diagrammatic fashion such a cabin pressure control device to govern cabin pressure by regulating outflow from the cabin. This pressure control device, which is a complete and operative unit in itself, may or may not be interconnected to the inlet flow control. Its construction, essential nature, and mode of operation are disclosed in our companion case entitled Pressure Cabin Control, Patent No. 2,450,881, issued October 12, 1948, to which reference is made for a fuller understanding of that control device. While this pressure control device has been illustrated, and by preference is included as part of the present system, other pressure control devices similarly operable may be substituted as part of this system.

The essential nature of our invention has been explained above. Briefly it is an object of this invention to provide a complete system for the supply and control of pressure within an aircraft cabin which, due to changes of altitude, is subject to wide variations of external pressure, so that the cabin pressure, at least from a given altitude upwardly, may be increased, usually automatically, above external pressure, may be so regulated, when the design so requires, that a selected differential of cabin pressure over external pressure is automatically never exceeded, and which, for use in conjunction with an outflow control device, incorporates an inflow control which operates primarily by controlling the effective output of a compressor, in accordance with cabin pressure or flow conditions, and in a manner to avoid wastage of power in unnecessary compression. The control of the compressor output may be effected in various ways, and the drawings illustrate diagrammatically a number of such ways of controlling the compressor's output.

Figure 1 is a view of the system, showing an interconnection between the outflow and inflow control devices and a particular form of inflow control, hydraulic in nature.

Figure 2 is a similar view of a different arrangement, largely mechanical in nature.

Figure 3 is a similar view of a further modification, hydraulic in nature but differing specifically from that of Figure 1.

Figure 4 is a similar view, illustrating the outflow control entirely independent from the inflow control, and the control of the latter electrical in nature.

Figure 5 is a similar view, showing an inflow control which employs a separate power plant instead of a propelling engine.

Figure 6 is a similar view, illustrating a control for the inflow which is a hydraulically controlled epicyclic transmission.

Figure 9 is a view similar to Figure 1, but illustrating a different type of interconnection, for balancing, between the outflow control and the inflow control, largely pneumatic in nature, and Figure 10 is a similar view, illustrating a similar interconnection, largely electrical in nature.

Figure 11 is a graph of the pressure relations involved.

Figure 8:
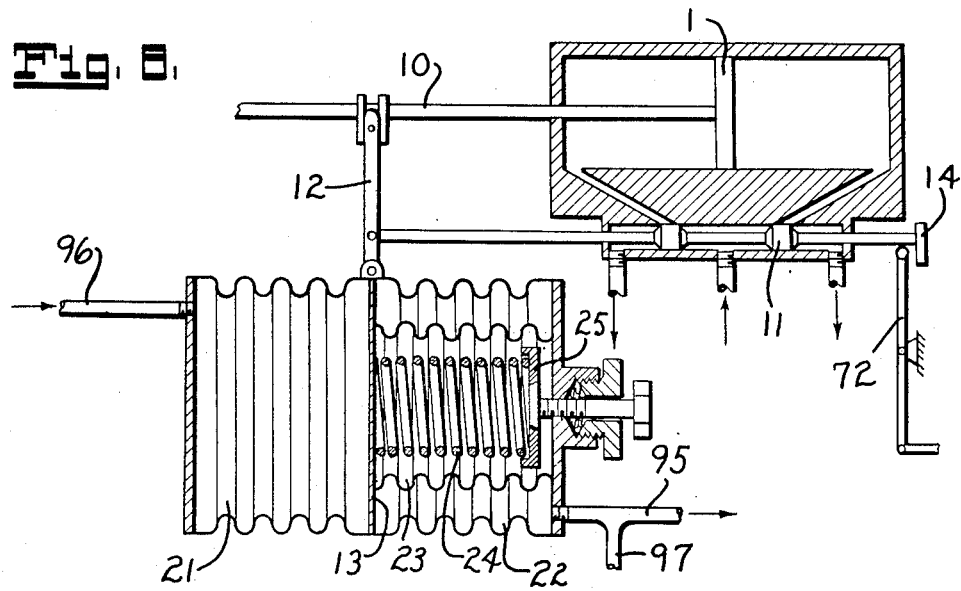
Figure 8 is a detail view, largely diagrammatic in character, but illustrating a control device in somewhat greater detail than is shown in the other views.

In the diagrammatic drawings the cabin of an aircraft is represented at 9. The sustaining wings, controls, and the like, have been omitted to simplify the description. This cabin has an inflow conduit 90 and an outflow port or conduit 91. The cabin 9 would be reasonably air-tight, though a small amount of leakage is inevitable. Pressure is supplied within the cabin 9 from a suitable pressure source, such as a compressor 7 and inflow conduit 90, and the value of such pressure is regulated, with reference to atmospheric pressure, by automatic controls, and the flow rate is just sufficient to compensate for normal leakage, and to provide an excess for ventilation. The pressure within the cabin is controlled by means of an outflow valve 92. It is the function of the compressor always to supply air under adequate but not excessive pressure, at the desired low rate of flow. This it accomplishes by a flow sensitive device, as later explained. The outflow valve is subject to certain automatic controls, primarily pressure sensitive devices, and more specifically, for a preferred arrangement, one of these is an absolute-pressure sensitive device to increase the cabin pressure automatically from a given low altitude upwardly, and perhaps to maintain that pressure constant, until a selected differential of cabin pressure over external atmospheric pressure is attained, at which point an overriding differential-pressure sensitive device automatically takes over, and from that point upwardly prevents this differential of pressure being exceeded. The automatic control device is intended to be represented as within the enclosure 93, and the details of the device can be ascertained from our companion application referred to above. It is sufficient to note that the outflow valve 92 tends increasingly to close as the aircraft ascends and external pressure drops in order to maintain a given cabin pressure, but that the outflow valve 92 tends to open when the selected differential is reached, in order to prevent that differential being exceeded. Fresh air at proper density and pressure is always supplied in excess of expected (or normal) leakage, so the valve 92 is never closed during normal operation, wherefore there is continual flow through the cabin to provide the necessary ventilation. It is therefore seen to be necessary to continually supply fresh air under pressure to maintain cabin pressure equal to or above external pressure, and at a rate which is a function both of total outflow and of absolute cabin pressure.

In the arrangement of Figure 1, a propelling engine is indicated at 8, from which power is derived to drive the compressor 7, having its intake at 70. Instead of being driven by the airplane propelling engine 8 the compressor 7 may be driven, in any form of the system, by an independent or auxiliary power plant 80, as in Figure 5.

The devices of the several figures differ from one another principally in (a) the manner of transmission of power from the power plant to the compressor, and (b) the manner of control or regulation of that transmission, and thereby of the output of the compressor. In Figure 1, power is transmitted from the engine 8 to the compressor 7, or to the speed-up gearing in the casing 71, by means such as the hydraulic transmission which consists of the two plates 81 and 82, sufficiently closely adjacent within the oil-filled casing 83 and so formed as to transmit power from the engine driven impeller 81 to the compressor-connected receiver 82. The effectiveness of this type of hydraulic transmission may be governed by the degree to which the casing 83 is filled with liquid, and this in turn can be controlled by the regulating valve 84 controlling supply of liquid through the pipe 85 to the casing 83, from which it drains by way of the return pipe 86. The position of the valve is controlled by a handle 87.

Since the position of the valve 84 can control the transmission of power from the engine 8 to the compressor 7 it is possible to arrange automatic means to control the position of this valve, or its equivalent in the other figures. Such control device is illustrated as grouped within the enclosure 19. In the form shown in Figure 1 it includes a servo piston 1, connected by the piston rod 10 to the valve control arm 87. The servo piston 1 is controlled by the pilot valve 11, which is connected through the floating lever 12 to the diaphragm 13. The diaphragm is connected, as a follow-up, to the piston rod 10 by way of the lever 12. It is subject on its opposite faces to two forces that vary in accordance with flow conditions through the conduit 90. The diaphragm 13 is merely representative of a pressure-sensitive device such as is shown in detail in Figure 8, to which reference is now made.

The diaphragm 13 is interposed between two collapsible bellows to define the chambers 21 and 22. Within the chamber 22 there may be an evacuated bellows 23. If this bellows 23 were not used the venturi, later described, would tend to maintain merely a constant volume flow, and a constant weight flow is preferable to supply adequate oxygen, when the volume flow is low. By the addition of the evacuated bellows 23 the reduction in density in the supply duct communicating with bellows 21 reduces the forces tending to collapse the bellows 23, effecting its movement, as viewed in Figure 8, to the left, increasing the volume flow. Thus it compensates for reduced density by increasing the volume flow. A compression spring 24, the location of which, inside or outside of the bellows 23, is unimportant, bears at one end upon an axially adjustable base 25, and at its other end urges the diaphragm 13 to the left.

The pressure within the inflow conduit 90 (Figures 1, 4, 5, 6, 7, 9, and 10), or within the cabin or its outflow port 91 (Figure 2), may be considered a plus pressure, which is a function of cabin pressure and of flow-through (or within the compressor inlet 70, as in Figure 3, which is a function of inflow pressure), as related to the minus or lower pressure of the corresponding venturi or subventuri 94 (Figures 1, 4, 5, 6, 7, 9, and 10), or 94a (Figure 2), or 94b (Figure 3). This plus pressure is applied, via 96, 96a, or 96b, to the left-hand side of the diaphragm 13 (Figure 8), in opposition to the spring 24. The corresponding minus pressure, applied via 95, 95a, or 95b, to the right-hand side of diaphragm 13, assists the plus pressure on the opposite side. The spring force, at any given adjustment, reaches equilibrium in a given position with the resultant of the pressure forces, at some given value of the relative pressure forces. If the resultant of the pressure forces is decreased, by decreased rate of flow, which in turn reflects cabin pressure and flow conditions, the spring force gains the ascendancy and moves the diaphragm 13 to the left (Figure 8) and the servo piston 1 to the right, until by expansion and weakening of the spring, or by increase of the resultant pressure force, the opposed forces again reach equilibrium in a new position. Conversely, an increase in the relative pressure forces, such as would be produced by an increased rate of flow, would move the diaphragm to the right, and the servo piston 1 to the left, until stiffening spring resistance or decrease of the resultant of the pressure forces brings the parts into a new position of equilibrium. In any such position of equilibrium the pilot valve 11 is in closed position, and since the diaphragm has shifted, it is clear that the servo piston 1 has also shifted, but in the reverse direction. Such pressure-sensitive regulators are known, and no claim is made to them, except in the manner of their connection and operation in the system as a whole.

Because of the inclusion of the evacuated bellows 23, the pressure communicated from the throat of the venturi through the conduit 95, 95a or 95b acts over only a part of the area of the diaphragm 13. Thus, any change in the density of the air flowing in the inflow conduit 90, the outflow port 91 or the compressor inlet 70, as the case may be, whilst not affecting the pressure difference of the air on the two sides of the diaphragm, changes the total forces acting on the diaphragm. A reduction in the density of air in the supply duct communicating with the bellows 21 reduces the forces tending to collapse the bellows 23, effecting its movement, as viewed in Figure 8, to the left, to increase the volume flow of air. Thus it compensates for reduced density by increasing the volume flow.

If the rate of flow applicable to the regulator 19 tends to change, it is normally because the ratio of the density of the compressor outlet air to the density of the inlet air has changed. Such change may be caused either by change in the airplane altitude, by change in cabin pressure as controlled by regulator 93, or by changes in both altitude and cabin pressure. Thus referring to Figure 11, $a, b, c, d$, may be taken as representing typical operation of the system through an unsupercharged range (cabin pressure is slightly above atmospheric due to a restricted outlet), a range of isobaric regulation, and a range of differential regulation with relation to the atmospheric curve $a'—n—r—t—d'$, and $a—x—y—z$ represents a proportional type of regulation with relation to the sea level pressure $a—m—p—s—u$ and to the atmospheric curve referred to above. The ratio of $ef/eg$ is different from the ratio of $hj/hk$, in the unsupercharged range, hence the compressor, in order to maintain a constant rate of flow into the cabin, regardless of this change in the density ratio, tends to speed up. In similar fashion, in the isobaric range, the ratio of $mb/mn$ is different from the ratio $pq/pr$. Here cabin pressure remains constant, but the density ratio changes due to change of altitude, consequently, the compressor must speed up to maintain constant pressure. Similarly, in the range of differential regulation, the ratio $sc/st$ is different from the ratio $uv/uw$. Here there is a change in absolute cabin pressure, but no change of cabin pressure with relation to atmospheric pressure, a constant differential being maintained, yet because there is a change in the density ratios referred to above, again the compressor must speed up to maintain this cabin differential pressure. More work must be done to compress the lower density air. In similar fashion it would be found that during proportional pressure change regulation, for instance, if it is desired to maintain constant the ratio of the drops in cabin and atmospheric pressures from sea level values, $$\frac{hx}{hk}=\frac{py}{pr}=\frac{us}{uw}$$

while the density ratio remains the same, still the compressor must speed up to maintain the desired pressure.

It can now be seen that since, dependent on extraneous factors, change in compressor speed effects under some conditions a change in pressure, and under different conditions effects a change in rate of flow, these changes can be summarized by saying that a change in compressor speed varies the effective output from the compressor. Regulation of output, then, implies either a change of pressure or a change of rate of flow, and either or both are comprised within the term "change of output."

In contrast to the above, and still referring to Figure 11, the line A—B—C—D represents the graph of a direct-driven constant speed centrifugal compressor such as was intended to be employed, and was employed, in the Price system. Such a blower would be chosen as would, at the point L, produce the requisite cabin pressure. The point L represents the intersection of a selected upper altitude limit and the chosen cabin differential pressure curves. This point had to be related to the ratio of absolute cabin pressure to atmospheric pressure; in the example chosen the ratio is 3 to 1. This 3 to 1 ratio applies, then, to all altitudes, and determines the entire graph A—B—C—D. At A the blower pressure (at sea level) is three times atmospheric. All power in excess of that required to maintain a desired cabin pressure is lost, however. It follows that the cross-hatched area A—B—C—L—c—b—a represents wasted power.

In Figure 1 the valve 84 is an indirect compressor speed control. Normally it is partly open, and because it is not fully open it restricts the amount of oil within the transmission casing 83 to less than sufficient to drive the compressor 7 at top speed. Movement of the servo piston 1 to the right, due to decreased flow, moves the valve 84 more fully towards open position, more completely fills the casing 83, and speeds up the compressor 7.

Should the compressor 7 tend to overspeed, the governor-controlled arm 73 moves the lever 72 into contact with the contact member 14 on the stem of the pilot valve 11, shifting the latter and entraining corrective movement of the servo piston and compressor speed control. The compressor governor may be operative in any other suitable manner, as by controlling a restriction in the line 85.

As described above, there is no necessity for any interconnection between the outflow control device 93 and the inflow control device 19. Indeed, in Figure 4, no such interconnection is shown. The outflow control device operates, as designed, independently of the inflow control, except that, through the operation of each, conditions which effect the other are altered, and indirect control is thus exercised. Contrariwise there may be a direct balancing interconnection between the outflow control and the inflow control, and such an interconnection is shown at 97 in Figure 1.

Since it is a change in the resultant of the pressure forces acting upon the diaphragm 13 which initiates a shift to a new position of equilibrium, and which changes the compressor's speed, and since it is possible to vary that resultant by change of either component or of the two jointly, as described, it becomes clear that the outflow control can influence the action of the inflow control by a pressure or suction connection to one side or the other of the diaphragm 13.

In the arrangement of Figure 1 the tube 97 connects with the minus pressure connection 95, and past the orifice block 98 with the cabin interior pressure. Normally communication is closed through the orifice block 98 by the stem 99 which forms part of the outflow valve mechanism, and which rises and falls with the valve 92. If the valve 92 closes down sufficiently, trying to conserve pressure, and thus calling for an increased output of the compressor, cabin pressure is admitted to the interior of the tube 97, and tends to destroy the suction or minus pressure in the tube 95. As a consequence the equilibrium of forces at opposite sides of the diaphragm 13 is destroyed, and the servo piston 1 is moved in such direction as to increase the speed of the compressor. The action proceeds as previously described.

For adjustment of the initial position and for manual operation or adjustment during flight, suitable means may be provided. This has been suggested diagrammatically by the manual adjustment 88 in Figure 1, operatively connected to vary the force of the spring 24 against the diaphragm.

The arrangement shown in Figure 3 is similar, in respect to the control of the diaphragm 13, to that described except that the tube 97b is permitted to communicate, not with the interior cabin pressure, but with the lower external pressure. In similar fashion, when this lower pressure is admitted to one side of the diaphragm 13 the equilibrium of the parts is destroyed, and compensating adjustment of the compressor's speed control is made.

In Figure 2 the arrangement is substantially similar to that shown in Figure 1 except that the compressor's speed control is primarily mechanical in its nature. That shown is merely illustrative of a principle. Thus, for instance, the piston rod 10 is connected by the lever 12a to an intermediate roller 3 interposed between and shiftable axially of two parallel, reversed cones 31 and 32, one of which is driven from the engine 8 and the other of which drives the compressor 7 through the gearing 71.

The arrangement shown in Figure 3 resembles that of Figure 1, except that in place of the impeller and receiver type of hydraulic transmission there is provided an engine driven variable displacement hydraulic pump 81a, the delivery whereof is variable by the control handle 87a, and driving the constant displacement receiver or slave unit 82a, which in turn drives the compressor 7.

Figure 4 suggests an arrangement which is electrical in nature. 81b is intended to represent an engine driven generator and 82b a variable speed motor. A contact arm 4 is in circuit between the generator and the motor, and the value of the current supplied is a function of the position of the contact arm 4 with relation to a rheostat 40. The contact arm 4 is controlled in its position by the diaphragm 13, which for convenience is shown as divided into two halves, and the relative position of the rheostat 40 is controlled by the speed governor arm 73 and by the manual adjustment 88, the two acting through a floating lever 74.

A temperature control is introduced in Figure 4, in the form of a bimetal thermostat 41 within the conduit 98, connected by a link 42 to shift the contact arm 43 with relation to a rheostat 44, also included in the motor-generator circuit. A higher temperature air will have less density at a given pressure, than air of lower temperature. The thermostat serves to maintain constant weight flow, by movement of the rheostat arm 43 to speed up the motor 82b and consequently the compressor 7, as the temperature increases.

The arrangement of Figure 5 is substantially the same as that of Figure 1, with the exception that the compressor is driven by an independent or auxiliary power plant, as has already been noted, and it is the speed of this power plant through its throttle lever 5 that controls the speed of the compressor 7. The throttle arm 5 is connected by the link 59 to the piston rod 10 of the servo piston 1.

The arrangement of Figure 6 suggests a connection between the prime mover or engine 8 and the compressor 7 through epicyclic gearing, generally represented at 6. The driving gear 61 is directly connected to be driven by the engine 8, and the gear 62 is fast upon the shaft 60 which drives the blower 7 through its normal gearing 71. Between the two is the ring gear 63, externally in mesh with the driving gear 61 and loose upon the shaft 60, and the planet gears 64 are in mesh with the internal gearing of the ring gear 63, and are in mesh also with the driven gear 62. These planet gears 64 are yoked together, as indicated at 65, and by variably retarding or permitting the free rotation of these gears 64 with the ring gear 63 the effective speed of the compressor can be controlled. The rotation of the yoke 65 may be permitted or retarded, and the degree thereof controlled, by means such as the hydraulic pump 66, which is driven when the gears 64 revolve about their common axis, but the rotation of the hydraulic pump can be retarded or stopped by suitable restriction in the lines 67 and 68 which include a control valve 84a, similar in construction and function to the valve 84 of Figure 1.

Figure 7:
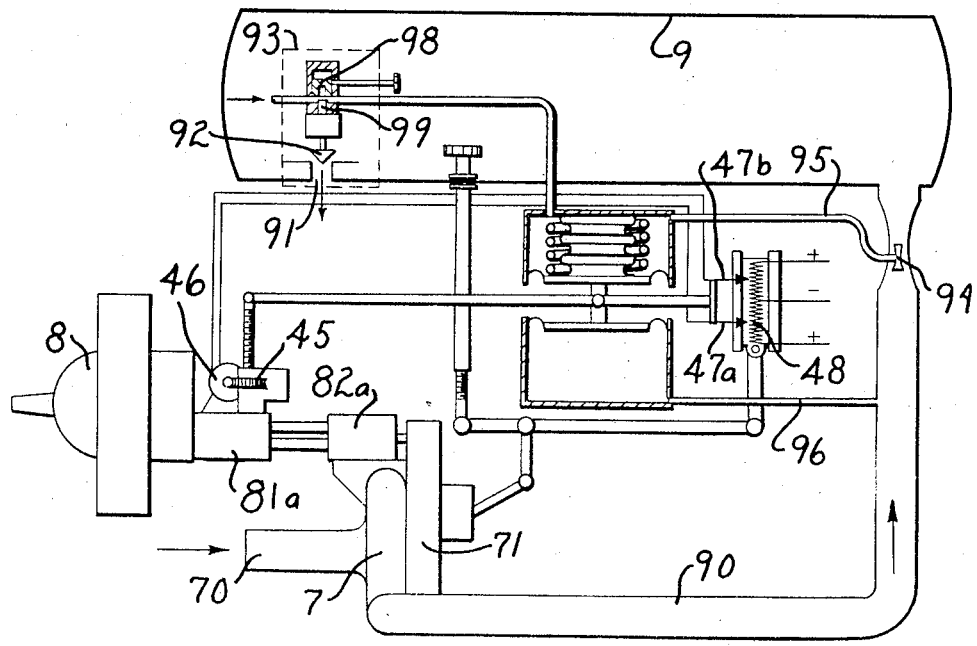
Figure 7 is a similar view of the system combining hydraulic and electric controls.

In Figure 7 the compressor 7 is variably driven through a hydraulic pump 81a and receiver or motor 82a, the control of which may be effected by rotation of the gear 45 controlled by the electric motor 46 and driven in one direction or another in accordance with the position of the contact arms 47a and 47b with relation to the double rheostat 48. The arrangement in this respect is quite similar to that shown in Figure 4.

In Figures 9 and 10 the regulator 19 is not shown in detail, but is similar to that already described with relation to the other figures. The drive connection between the engine 8 and the compressor 7 is the hydraulic pump-receiver combination 81a, 82a, previously described. However, here a second pressure regulator, including the diaphragm 13a with a needle valve 13b controlling intercommunication between its opposite faces, is acted upon by pressure of the cabin admitted directly by way of the tube 101 to one side of the diaphragm 13a, and by exterior pressure admitted to the opposite side of the diaphragm through the tube 102, extending past the orifice block 98. By this arrangement there is direct control, still through a servo piston 1a, of a control valve 103 which controls the regulator 19 by altering the pressure relationship in the tubes 95 and 96, thus calling for a changed output of the compressor.

The same result is achieved in the arrangement of Figure 10, but now by means of electrical devices including the double ended reversing rheostat 105, in conjunction with the contact 106 movable with the valve 92. The circuit, when closed, operates a differentially reversible motor 107 in a manner to adjust the control valve 103 in the manner described with relation to Figure 9. In each of these views a manual control 108 is shown for the valve 103, which manual control is operable from within the cabin.

Since the setting of the outflow valve 92 controls the cabin pressure, by continuous adjustment thereof, as explained in our companion application, any proportionate cabin pressure can be attained, that is, any relationship such as is represented in Figure 11 by the line a—x—y—z. The regulator 19 will, nevertheless, maintain an adequate compressor output, and will control the rate of inflow. In any such case the engine which drives the compressor 7 might well be an auxiliary engine, rather than one of the propelling engines, so that changes of engine speed coupled with the lag of the regulating system would not affect the cabin pressure, and so that changes of compressor power requirements would not affect the performance of the aircraft.

What we claim as our invention is:

1. A system for the control of airflow through an aircraft cabin which has an outflow port continually open at all altitudes, comprising a compressor connected to discharge air into the cabin, means variably controlling outflow from the cabin, and governing means regulating operation of the compressor automatically in response to flow through the cabin, to maintain such flow substantially at a desired rate, said governing means being also responsive to cabin pressure, to maintain an air density at the desired flow rate such as to create a difference of cabin pressure over external pressure, above a selected altitude.

2. A cabin pressure control system comprising a compressor arranged to discharge air into the cabin, a servo control, means sensitive to rate of flow from the compressor to the cabin to affect said servo control, an operative connection between the servo control and the compressor, to vary the effective speed of the compressor automatically in response to said flow-sensitive means, to maintain a substantially constant rate of inflow to the cabin, and means sensitive to cabin pressure arranged to affect said servo control, and thereby to effect corresponding change of the compressor's output, automatically in response to a predetermined change in cabin pressure.

3. A pressure controlling system for an aircraft cabin which has an inlet and an outlet, comprising a compressor connected to supply air to the cabin through the inlet, an outflow valve at the outlet, means automatically operable in response to cabin pressure to regulate said valve to maintain a desired cabin pressure, and to permit outflow from the cabin always in excess of normal leakage, means automatically operable in response to a cabin flow factor to regulate the output of the compressor, tending to maintain the total inflow rate within a predetermined range of values, and further means operable automatically as the valve approaches closed position to increase the output of the compressor above such predetermined range.

4. A system for the control of the pressure within and flow through an aircraft cabin having an outlet, comprising a compressor connected to discharge air into the cabin, and means automatically operable in response to rate of flow of air to regulate the compressor's output rate to maintain a desired minimum flow of air through the cabin at a desired cabin absolute pressure, and further operable automatically in response to cabin pressure to increase the compressor's output rate upon decrease of cabin pressure below such desired absolute value.

5. A pressure controlling system for an aircraft cabin having an outlet, comprising a compressor connected to supply air to the cabin, means automatically operable in response to cabin pressure to regulate the outflow through the outlet to maintain a desired cabin pressure, and means automatically operable normally in response to rate of flow of air through the cabin and under abnormal conditions in response to a decrease in cabin pressure to regulate the output of the compressor, to maintain the cabin pressure and the total quantity of air flow, respectively, within selected ranges of values.

6. A system for the control of airflow through an aircraft cabin having an outflow port, comprising a compressor connected to discharge air into the cabin, means operable automatically in response to cabin pressure to regulate the outflow through the outflow port to maintain the desired excess of cabin pressure over atmospheric pressure, and means regulating operation of the compressor automatically jointly in response to rate of inflow of air into the cabin, and in response to operation of said outflow regulating means, to maintain at least a desired quantity of airflow through the cabin at the cabin pressure maintained by said first means.

7. A system for the control of pressure within an aircraft cabin, comprising a compressor connected to discharge air into the cabin, an air outlet, means variable to control outflow from the cabin through said outlet, and to create a difference of cabin pressure over external pressure, air flow responsive means normally operable to regulate the effective output from said compressor to the cabin, and means operable automatically in response to excessive outlet restricting movement of said first means to acutate said flow responsive means for increasing the effective output from said compressor.

8. In combination, a fluid compressor, variable speed driving means for the compressor, means which creates a pressure difference which bears a definite relation to the rate of flow of fluid from the compressor, regulating means for the variable speed driving means including a movable member, conduits connecting the pressure-difference-creating device to said movable member, a by-pass connecting said conduits for regulating the amount of created pressure difference applied to said movable member, and means for adjusting said by-pass.

9. In combination, a fluid compressor, variable speed driving means for the compressor, means which creates a pressure difference which bears a definite relation to the rate of flow of fluid from the compressor, regulating means for the variable speed driving means including a movable member, conduits connecting the pressure difference creating device to said movable member, means forming a by-pass connecting said conduits, and means for varying the effective area of said by-pass.

10. In combination, a fluid compressor having a discharge conduit, driving means including a variable speed fluid coupling for the compressor, a regulating valve controlling the flow of fluid to the coupling, means including a movable abutment for positioning said regulating valve, a pressure difference creating device which creates a pressure difference which bears a definite relation to the rate of flow in said discharge conduit, conduits connecting the pressure difference creating device to said abutment, and a by-pass for regulating the amount of the created pressure difference applied to said movable abutment whereby the flow of air through the discharge conduit may be varied.

11. In combination, a fluid compressor having a discharge conduit, driving means including a variable speed fluid coupling for the compressor, a fluid pressure pump driven by said driving means, means including a regulating valve connecting the discharge side of said fluid pressure pump to said fluid coupling, means including a movable abutment for positioning said regulating valve, a pressure difference creating device which creates a pressure difference which bears a definite relation to the rate of flow in said discharge conduit, conduits connecting the pressure difference creating device to said abutment, a by-pass for said conduits, and a valve member in said by-pass for varying the effective area of the by-pass.

12. In combination, a supercharger, variable speed means for driving the supercharger, manually operated means for regulating said variable speed means through a lower speed range, and automatic means responsive to an operating condition appurtenant to the supercharger for regulating said variable speed means through a higher speed range.

13. In combination, a supercharger, variable speed means for driving the supercharger, manually operated means for regulating said variable speed means through a lower speed range, automatic means for regulating said variable speed means, and an overspeed governor for the supercharger.

JAMES B. COOPER.
ALFRED B. JEPSON.

REFERENCES CITED

The following references are of record in the file of this patent:

UNITED STATES PATENTS

| Number | Name | Date |
|---|---|---|
| 1,562,663 | Strong | Nov. 24, 1925 |
| 1,655,683 | Stauderwick | Jan. 10, 1928 |
| 2,002,057 | Gregg | May 21, 1935 |
| 2,208,554 | Price | July 16, 1940 |
| 2,265,461 | Wagner | Dec. 9, 1941 |
| 2,284,984 | Nixon et al. | June 2, 1942 |
| 2,295,728 | Gess | Sept. 15, 1942 |
| 2,297,495 | Pfau | Sept. 29, 1942 |
| 2,390,487 | Lawrence et al. | Dec. 4, 1945 |
| 2,450,881 | Cooper et al. | Oct. 12, 1948 |
| 2,451,835 | Johnson | Oct. 19, 1948 |

FOREIGN PATENTS

| Number | Country | Date |
|---|---|---|
| 149,709 | Great Britain | Aug. 17, 1920 |